United States Patent [19]

McElroy

[11] Patent Number: 4,484,975
[45] Date of Patent: Nov. 27, 1984

[54] HAND HELD APPARATUS FOR JOINING SMALL DIAMETER PLASTIC PIPE

[75] Inventor: Arthur H. McElroy, Tulsa, Okla.

[73] Assignee: McElroy Manufacturing, Inc., Tulsa, Okla.

[21] Appl. No.: 572,806

[22] Filed: Jan. 23, 1984

[51] Int. Cl.³ .................. B29C 27/12; F16L 13/02; F16L 47/02
[52] U.S. Cl. .................. 156/503; 156/158; 156/304.2; 156/304.6; 156/499; 156/507; 156/579
[58] Field of Search .............. 156/158, 304.1, 304.2, 156/304.6, 499, 502, 503, 507, 579

[56] References Cited

U.S. PATENT DOCUMENTS

| | | | |
|---|---|---|---|
| 3,013,925 | 12/1961 | Larsen | 156/304.6 |
| 3,359,151 | 12/1967 | Hall | 156/579 |
| 3,727,289 | 4/1973 | Bemelmann et al. | 156/503 |
| 3,729,360 | 4/1973 | McElroy | 156/499 |
| 3,976,534 | 8/1976 | Walter et al. | 156/579 |
| 4,174,996 | 11/1979 | Hunter | 156/499 |
| 4,352,708 | 10/1982 | McElroy | 156/499 |

Primary Examiner—Michael Wityshyn
Attorney, Agent, or Firm—Head, Johnson & Stevenson

[57] ABSTRACT

A hand held apparatus for joining coaxially two lengths of small diameter plastic pipe comprises two parts. One part forms a first handle, and is attached to a horizontal frame at right angles. The frame holds at one end a stationary clamp into which one end of a first pipe can be inserted and locked in position. The other end holds a movable clamp which is a cylindrical tubular device into which the second pipe is positioned and clamped. The tube of the second clamp slides axially in a cylindrical portion attached to the second end of the frame at the point of junction of the handle and the frame. A second handle comprises an arm with a U-shaped portion. One end of the second handle is pivoted at a selected point on the frame so that the second handle can rotate about the pivot which is perpendicular to the plane of the first handle and frame. The rotatable handle is adapted to reciprocate the movable clamp so as to bring the facing end of the second pipe towards the facing end of the first pipe. Means are provided for facing, heating and fusing the resulting molten ends of the two pipes.

9 Claims, 7 Drawing Figures

HAND HELD APPARATUS FOR JOINING SMALL DIAMETER PLASTIC PIPE

CROSS-REFERENCE TO RELATED PATENT

This application is related to U.S. Pat. No. 4,352,708, by the inventor of this application, and issued Oct. 5, 1982. U.S. Pat. No. 4,352,708 is inserted by reference into this application.

BACKGROUND OF THE INVENTION

This invention lies in the field of thermally joining small diameter plastic pipes by a hand held device.

There is a large body of art on the joining of large diameter plastic pipes, all of which requires large and heavy machinery. Heretofore there has not been any other satisfactory way of fusion joining small plastic pipe (i.e. under 2" and typically ½" to ¾" diameter). The joining of plastic pipe by fusion permits an accurate joining operation so that the ultimate conditions of the joints will be known.

While this invention uses the well known steps of facing the ends of the two pipes, heating the ends of the two pipes to a selected temperature and then applying the two ends of the two pipes together coaxially with a selected force. This invention fills the need where nothing has existed prior to the present time.

SUMMARY OF THE INVENTION

It is a primary object of this invention to provide a small lightweight hand-held apparatus that can be used for joining small diameter pipes of the order of 1" or less, by the fusion method.

It is a further object of this invention to provide a small fusion device which can be hand-held and manipulated by one hand while the other hand can be used to insert the facing device and the heating device so that as soon as the heating has been completed, the two pipes can be drawn together with a selected force.

The present invention comprises a small hand-held device constructed of two principal parts, which are pivoted together. A first part comprises an inverted L-shaped casting having at the outer end of the top horizontal leg a fixed clamping device, and at the other end corresponding to the junction with the long downwardly pointing portion of the L is a movable clamp. The vertical portion becomes one part of the handle, and a second portion of the handle is pivoted to the frame so that by squeezing the two pivoted parts of the handle, together, rotating the second handle, the movable clamp can be moved closer or farther away from the fixed clamp.

The second part of the device mainly the movable handle is in the shape of a rod or yoke with a U-shaped portion on top of it. The spacing between the arms of the U are such as to slip one arm on each side of the movable clamp portion.

The movable clamp comprises a tube of selected dimensions such that the largest pipe for the device will fit inside of the tube. At one end of the tube is a clamping device which is a short split cylindrical tube with inner diameter larger than the largest small pipe to be utilized. This is split on a diameteral plane into two portions, one of which is hinged to the fixed portion which is attached to the frame and the two parts are held together by screw and nut means.

The casting of the first part has a large diameter tubular portion which is machined out on the inside so as to accept the movable clamp cylindrical tube. This outer cylindrical portion provides a guide for sliding this movable clamp coaxially with the fixed clamp, so that the two ends of the pipes protrude from the inside faces of the two clamps can be brought into contact or separated at will by simple movement of the movable second handle portion.

Means are provided for facing the ends of the two pipes and heating the facing end surfaces of the two pipes, so that the ends of the pipes can be made molten and can be brought into contact where the molten material will join and form a joint which is as strong as the pipe itself.

BRIEF DESCRIPTION OF THE DRAWINGS

These and other objects and advantages of this invention and a better understanding of the principles and details of the invention will be evident from the following description taken in conjunction with the appended drawings in which:

FIG. 4 is a cross-section through the facing device, by means of which the two ends are faced plane and perpendicular to the axis of the tubes.

DETAILED DESCRIPTION OF THE PREFERRED EMBODIMENT

Before explaining in detail the present invention, it is to be understood that the invention is not limited in its application to details of the construction and arrangement of parts illustrated in the accompanying drawings. The invention is capable of other embodiments and of being practiced or carried out in a variety of ways. It is to be understood that the phraseology and terminology employed herein is for the purpose of description and not of limitation.

Furthermore, because of the difficulty of describing the device, it will be described with its position in which the inverted L is standing in a vertical plane on the end of the long arm and the fixed and movable clamps which hold the pipes are on the top of the device. Of course, it can be utilized in any position, that is, with its plane horizontal or vertical, at the option of the user.

Figure 1:
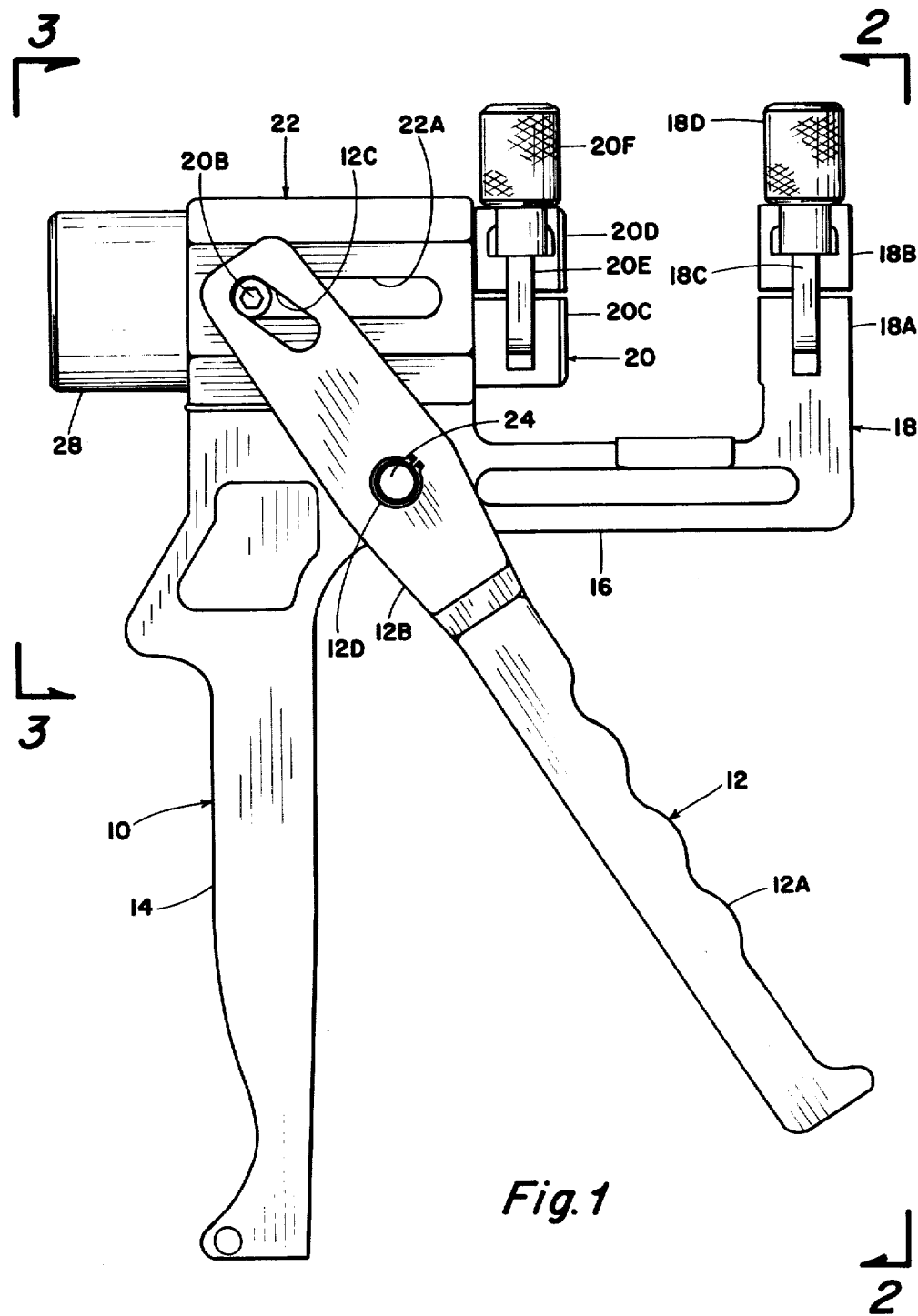
FIG. 1 is a side view of the complete device.

The description of this device will be made on the basis that FIG. 1 is in the plane of the apparatus which is shown in side elevation by FIG. 1. The device is standing in a vertical plane on the bottom end of the first part. The vertical portion of the first part forms a first part of the handle, the second part of the handle being formed by the second part.

Figure 2:
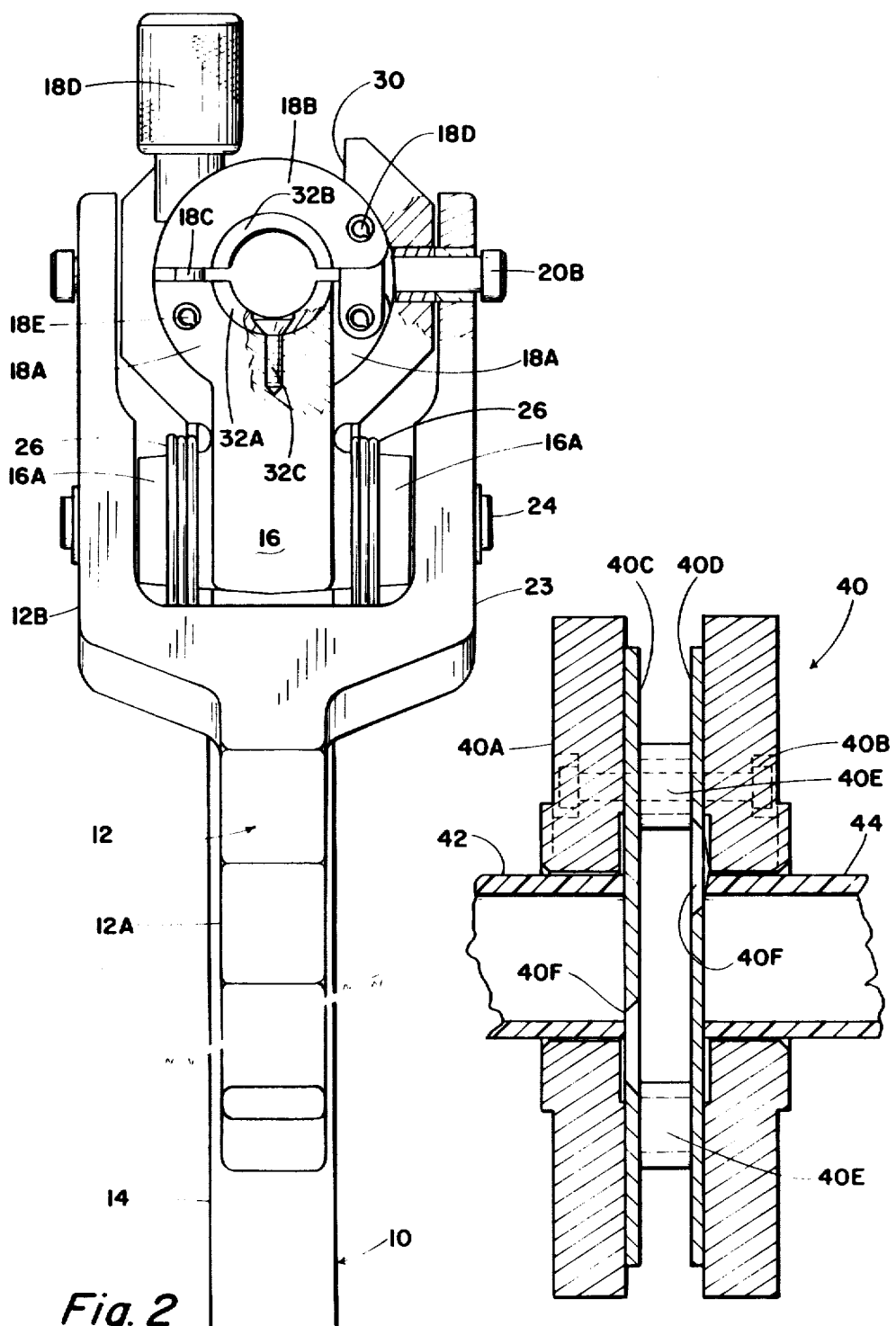
FIG. 2 is an end elevation taken across the plane 2—2 of FIG. 1.
Figure 3:
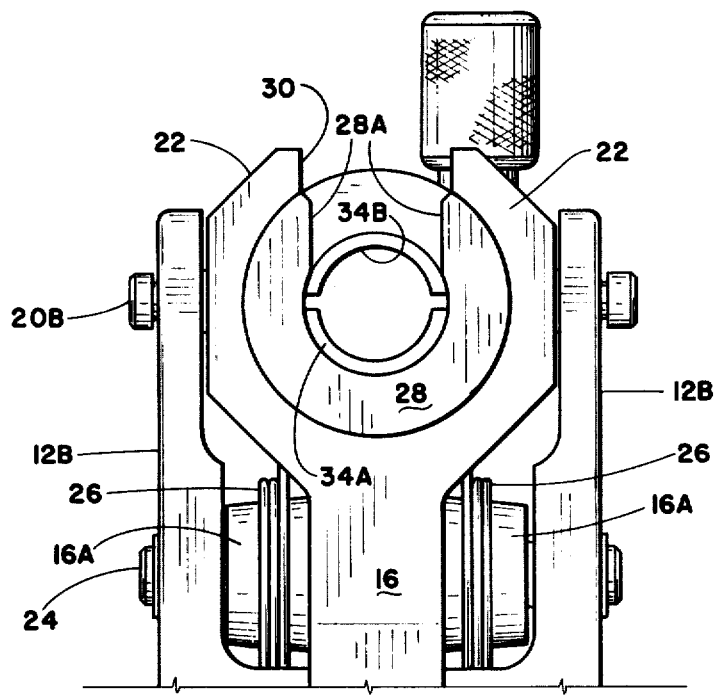
FIG. 3 is an end elevation taken across the plane 3—3 of FIG. 1.

Referring now to the drawings and in particular to FIGS. 1, 2 and 3, there is shown in FIG. 1 a side view of the apparatus of this invention indicated generally by the numeral 10. There are essentially two principal parts which cooperate with each other to carry out the capability of this device. The first part is a casting roughly in the shape of an inverted L. The first part provides a first handle portion 14. The second part, indicated generally by the numeral 12 and is pivoted about the first part by means of a transverse pin 24, in bearings 12D.

The short horizontal leg of the inverted L indicated by numeral 16 serves the purpose of a frame, which includes the fixed pipe clamp. At the outer end of the frame is mounted a short cylindrical part with its axis parallel to the frame axis. This can, of course, be formed as part of a casting which includes the first handle 14, the frame 16 and the portion 18A attached to the frame, which is a portion of the fixed clamp 18 which is attached to the frame.

At the other end of the frame is a large cylindrical portion 22, with its axis coaxial with the fixed clamp and, of course, parallel to the frame. For convenience this will be called a cylinder and is indicated generally by the numeral 22. This is bored out along its axis to accept a cylindrical tube 28 which will slide conveniently in the bored portion of the cylinder 22. At one end of the long cylindrical tube is a portion similar to the fixed clamp. However, since it is attached to the cylinder 28 and can slide axially, it is the movable clamp. The clamps per se are identical except that the lowe portion of the fixed clamp is attached to the frame 16, and the lower part of the movable clamp 20 is attached to the movable cylindrical tube.

The second handle indicated generally by the numeral 12 has two portions, a handle portion 12A more or less rod-like, and a U-shaped portion attached to the top of the handle portion, and indicated by the numeral 12B. This is wide enough to pass on both sides of the cylinder 22 (FIGS. 2, 3). The second handle is pivoted on a pin 24 transverse to the frame 16, where bosses 16A can conveniently be provided so as to provide a more rigid pivot axis.

The long cylindrical tube 28 which forms the main portion of the movable clamp has two screws 20B, one in each side forming the projections of a diameter. There is a horizontal slot 22A on each side of the cylindrical body 22, so that as the movable clamp slides axially, it is guided by the slot 22A so that it does not rotate about its axis, but simply translates.

There are also a pair of slots 12C in the ends of both arms of the second handle portion 12. The screws 20B that go into the long cylindrical tube are long enough to slide and be guided in the slit 22A and 12C. Thus, by rotating the arm or handle 12 on both sides about the pin 24, and by means of the screws 20B forces the movable clamp to the right bringing the two clamps closer together, and vice versa.

As will be seen clearly in FIG. 3, the long cylindrical tube 28 which is seen in end view, has a vertical slot, the walls of which are 28A, so that the pipe which is to go into the central portion of this tube can be moved down vertically into the slot and then into the central portion rather than shoved into the end of this tubular portion. It makes for a more rapid means of getting the pipes assembled in the clamps. Of course, the top of the cylindrical portion 22 also has a slot 30 leading into the slot of the movable clamp cylindrical tube.

FIG. 3 shows inside of the long cylindrical tube 28 rings or inserts 34A, 34B which are slit along a horizontal diametral plane. This is shown also in FIG. 2 where the lower and upper portions of the split rings are held into the frame 16 or the fixed clamp by means of a screw 32C. The inserts 32A, 32B have the same outer diameter, but may have different inner diameters so that when pipes of different diameters are used the proper size inserts will be used that will hold them tightly.

Furthermore, the insides of the inserts are provided with serrations or concentric grooves, peaks and valleys, or threads so that when the clamp is tightened the sharp edges of the serrations will rigidly grasp the pipe.

While not shown in the drawings, the inserts in the upper portions of the split rings are held by means of screws similar to 32C.

As shown in FIGS. 2 and 3, there are two helical springs 26, one surrounding each of the two bosses 16A. These are for the purpose of holding the second handle 12 out at a wide angle with the vertical handle so that the gap between the fixed and variable and movable clamps will be the largest possible.

Referring again to FIG. 2, there is shown as 18C a link which ties together the two pins 18D. This provides a hinging method to keep the two parts, the upper half and the lower half of each of the clamps tied together. Also, this clamp design allows for more complete encirclement of the pipe which results in improved rounding and more perfect alignment of the pipe of the pipe ends. On the opposite side of the clamp is a screw or eye bolt numbered 18C, which rotates about and is held by a pin 18E. A nut 18D is provided to lock the upper portion of the clamp down against the pipe which is held in the lower clamp.

Referring now to FIG. 4, there is shown in cross section one embodiment of a facing device for trimming the ends of the two pipes 42 and 44 which are inserted one into hubs 40A and 40B. Two thin steel plates 40C and 40D are provided with specially formed cutting edges. These provide a very sharp edge which are in contact with the ends of the pipe. Thus, the intersections 40F are indicated as the cutting edges of the disc, as the assembly 40 is rotated about the two ends of the pipes. The two hubs 40A and 40B are held together by screws indicated in dashed outline, with spacers 40E to make the two plates rigidly parallel to each other.

Figure 5:
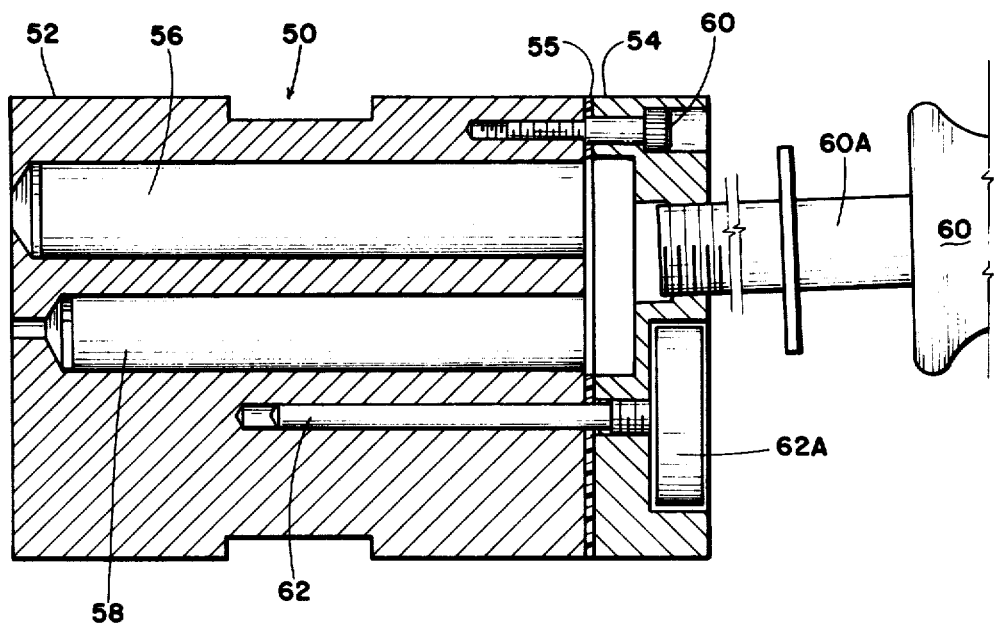
FIGS. 5, 6 and 7 show respectively a cross-section through the heater, and in FIGS. 6 and 7 a heater case is shown which is provided for holding the heater while it is being brought to proper temperature, and after the joint has been completed.
Figure 6:
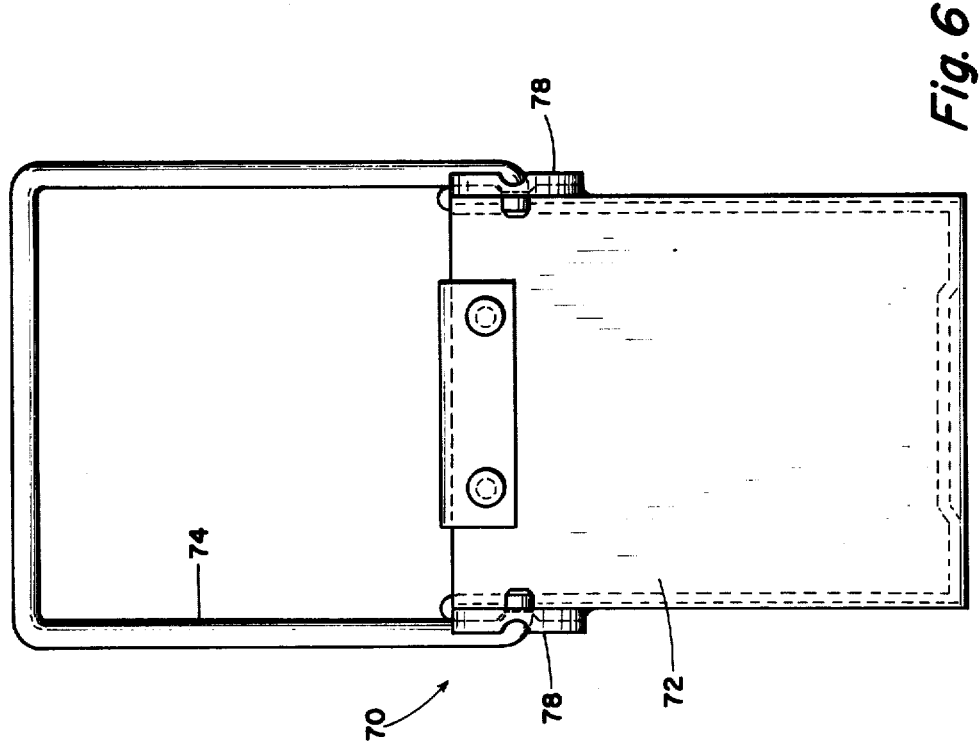
Figure 7:
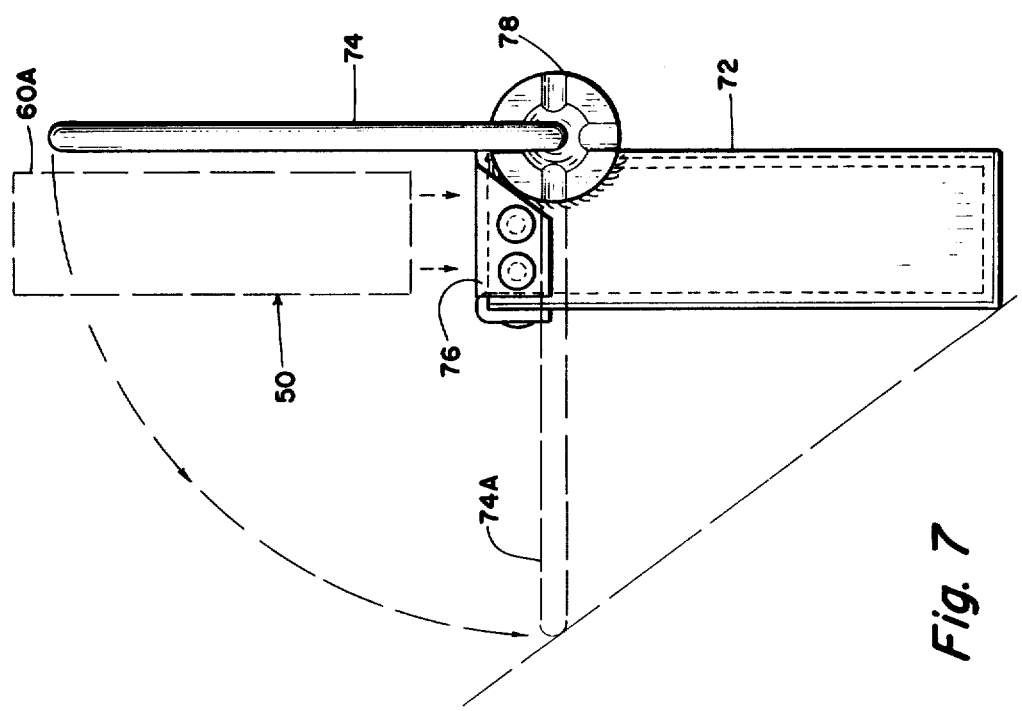

Referring now to FIGS. 5, 6 and 7, there is shown in FIG. 5, in cross section one embodiment of a heater. This heater can be placed between the two faced ends of the pipes 42, 44 to melt the plastic after which the heater is removed and the two ends of the pipes are placed in contact under a selected force. FIGS. 6 and 7 show two views of a holder and a carrying device for the heater.

The heater comprises a block of high heat conductivity material, such as aluminum indicated generally by the numeral 50. The heater is carried in the case 70 which is shown in FIGS. 6 and 7. The heater is rectangular cross section, and has three bored openings into the block from one end. One of these openings 56 is for a thermostatic switch so that the temperature to which the pipes are to be heated can be preset in advance. Numeral 58 indicates the heating element, and the numeral 62 indicates a thermometer with its indicating head at the end of the heater body. The thermostatic switch, heater element and thermometer are conventional and are purchased over the counter, and need not be described in greater detail. A handle 60 is joined to the body by means of a metal tube 60A which is inserted into the cover 54 of the heater device. A 12 volt battery can be the power source.

The heater carrying device 70 shown in FIGS. 6 and 7 is a necessary part of this system, since the heater unit must have a place where it can be set while it is being heated, and where it can be placed after the joint is completed and is being transported to another location. The body 72 of the heater carrier 70 is made from a heat resistant material, and has an internal cavity such that the heater attached to the handle can be inserted into the open end 76 of the device. A carrying handle is made out of a piece of rod or suitable material with enough springiness so that once it is spread apart and inserted through openings in the two portions 78, it can be set in a position to lie parallel to the box or substantially perpendicular to the box. In that position shown in FIG. 7 the handle 74A is locked against a plate 76. In this position, the heater case can be placed in a stable position on a level surface. In this way there is no danger of fire or injury.

What is claimed is:

1. A hand-held fusion device for joining two sections of small plastic pipe in coaxial, end-to-end relation, comprising:
    (a) a first inverted L-shaped frame of selected dimensions, one portion, the vertical part, comprising a first handle, the horizontal portion comprising a pipe clamp frame;
    (b) a stationary clamp at one end of said horizontal portion to hold one section of said pipe substantially parallel to said pipe clamp frame;
    (c) a movable clamp means mounted on said horizontal portion at the other end, with its axis parallel to said pipe clamp frame and coaxial with said stationary clamp;
    (d) a second handle part, pivoted to said L-shaped frame and adapted to control the axial position of said movable clamp relative to said stationary clamp.

2. The device of claim 1 in which said movable clamp comprises a coaxial cylinder and said movable clamp is coaxially reciprocatible within said cylinder.

3. The fusion device as in claim 2 in which said cylinder has two pins projecting diametrically outward of said tube, through two longitudinal slots in said cylinder; and further projecting through two longitudinal slots in the arms of said second part; the axis of said pins being within a horizontal plane of the axis of said pipe;
    whereby rotating said second handle about said pivot moves said movable clamp axially.

4. The fusion device as in claim 2 in which said second handle part comprises;
    a rod portion having a U-shaped portion on its end, with the arms sufficiently spread apart to move outside of said cylinder; said second handle part pivoted about a pin perpendicular to the plane of said L-shaped frame.

5. The fusion apparatus as in claim 4 and including spring means tending to maintain a gap between said fixed clamp and said movable clamp.

6. The fusion apparatus as in claim 5 in which said spring means comprises torsion spring means.

7. The fusion device as in claim 2, in which said stationary clamp comprises a diametrically split cylindrical tube of inside diameter such as to hold one section of said pipe; and means to tighten said split clamp about said one section of pipe.

8. The fusion device as in claim 7 in which said movable clamp comprises a split clamp attached to one end of said cylinder having a central opening large enough to hold one section of said pipe, a top portion of said cylinder removed to form a slot into which said pipe is placed, with its end projecting through said movable clamp.

9. The fusion device as in claim 8 in which each of said split clamps has two parts, an outer portion, and an inner portion or insert, the outer diameter snugly fitting the inner diameter of the outer parts; said inserts having inner diameters of the size of each size of pipe to be joined.

* * * * *